Jan. 16, 1940.  F. W. AVILA  2,187,410
AUTOMOTIVE VEHICLE
Filed July 23, 1938  7 Sheets-Sheet 1

Inventor
Frank W. Avila
By /. J. Lavagne
Atty.

Jan. 16, 1940.　　　F. W. AVILA　　　2,187,410
AUTOMOTIVE VEHICLE
Filed July 23, 1938　　　7 Sheets-Sheet 2

Jan. 16, 1940.　　　F. W. AVILA　　　2,187,410
AUTOMOTIVE VEHICLE
Filed July 23, 1938　　　7 Sheets-Sheet 3

Inventor
Frank W. Avila
By ......
Atty.

Jan. 16, 1940.  F. W. AVILA  2,187,410
AUTOMOTIVE VEHICLE
Filed July 23, 1938   7 Sheets-Sheet 4

Inventor
Frank W. Avila
By V. F. Lassagne
Atty.

Jan. 16, 1940.   F. W. AVILA   2,187,410
AUTOMOTIVE VEHICLE
Filed July 23, 1938   7 Sheets-Sheet 7

Inventor
Frank W. Avila
By V. F. Lassague
Atty.

Patented Jan. 16, 1940

2,187,410

UNITED STATES PATENT OFFICE 2,187,410

AUTOMOTIVE VEHICLE

Frank W. Avila, Fort Wayne, Ind., assignor to International Harvester Company, a corporation of New Jersey Application July 23, 1938, Serial No. 220,856

26 Claims. (Cl. 180—54)

This invention relates to an automotive vehicle. More specifically, it relates to an organization in which the power plant of the vehicle is arranged in a novel position relative to the chassis and the cab of the vehicle. The principal object of the invention is to reduce the overall size of a vehicle, particularly that part occupied by the driver and the power plant. A more specific object is to use an engine of the inverted V-type and to position the engine in the frame so as to obtain maximum use of the available space and to thereby cut down both the longitudinal and vertical dimensions of the cab and the power plant portion of the vehicle. More specific objects and the constructions by which they are attained will be apparent from the detailed description to follow.

In the drawings—

Figure 1:
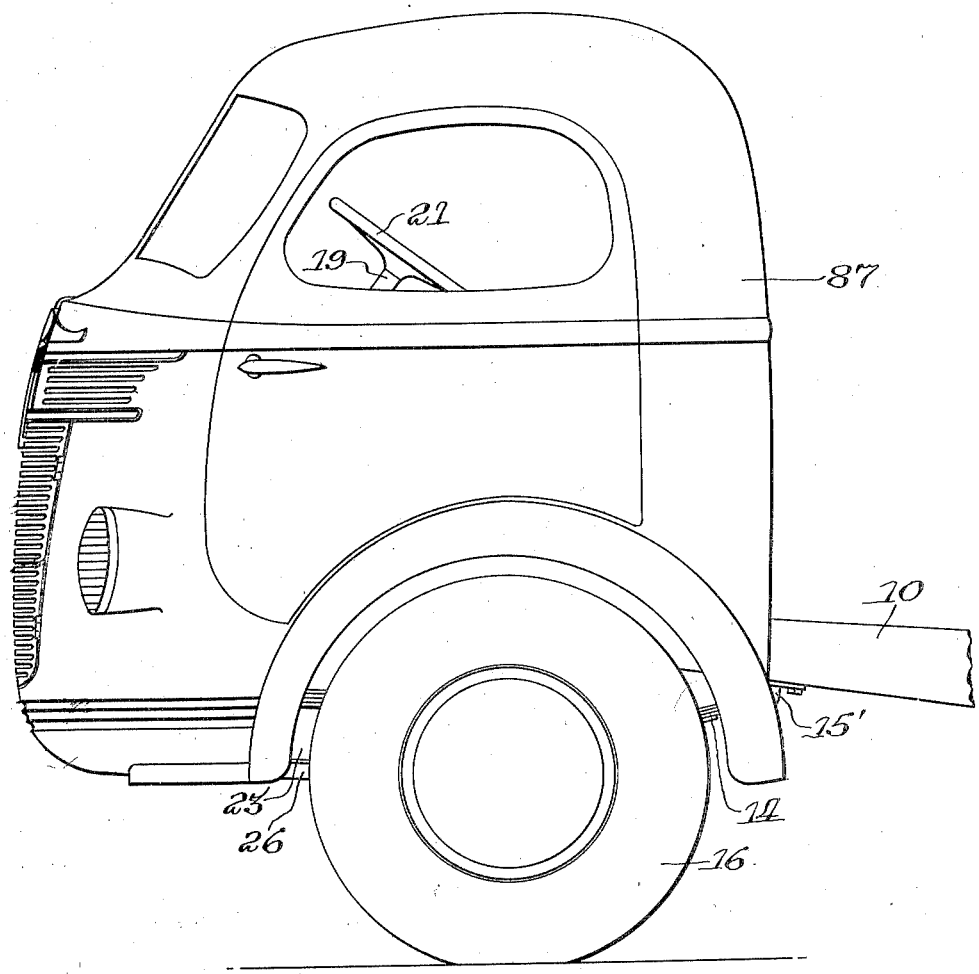
Figure 1 is a side elevation, showing in outline the front end of a truck with a cab particularly suitable for use on a vehicle embodying the invention.

In the drawings various units have been shown in outline and some have even been shown diagrammatically. For example, the cab structure is only representative of a general type which might be utilized on a vehicle incorporating the invention. Panel bodies, or other types of bodies, might equally well be utilized. The front portion, however, would be substantially the same, as well as the driver's seat and the foot compartment. The structure of the cab is immaterial and it has, therefore, been shown only by outlines with certain sills being shown in detail to illustrate one method of attaching the cab.

In the drawings, side frame members 10 are shown as diverging somewhat at their forward ends 11. This divergence is forward of the space required for short turns of the front wheels and allows more room for mounting the power plant and the accessories. A cross frame member 13 is shown as connecting the downwardly dipped front ends 11 of the frame members 10. The cross member 13 is bent outwardly and downwardly at the front, to form a lowered rounded contour.

Springs 14 are illustrated as being connected by brackets 15' to the frame members 10. Any conventional spring shackle construction may be utilized. The springs 14 are rigidly secured to an axle 15 on which steerable wheels 16 are mounted. A tie rod 17 connecting steering arms 18 is also operatively connected to a drag link 18', which extends forwardly to a position for connection with the steering mechanism. Said steering mechanism has not been shown in detail. A steering column 19 is suitably mounted and supported by a bracket 20. Said bracket may be secured by suitable means to the front cross frame member 13. A steering wheel 21 is illustrated to show the position in the cab relative to the driver's seat.

The engine utilized in applicant's novel vehicle is of the inverted V-type, in which two banks of cylinders extend downwardly and outwardly at an angle of 120 degrees with respect to each other. This comparatively flat form of the V engine is particularly adapted to a vehicle construction of this type, as it is desired to keep the vertical dimensions of the motor as small as possible, so that sufficient space in the transverse dimension is available for mounting the motor. The engine is basically of the design having an integrally cast crank case and cylinder blocks. This unit structure will be termed the engine block and designated by the numeral 22.

Figure 3:
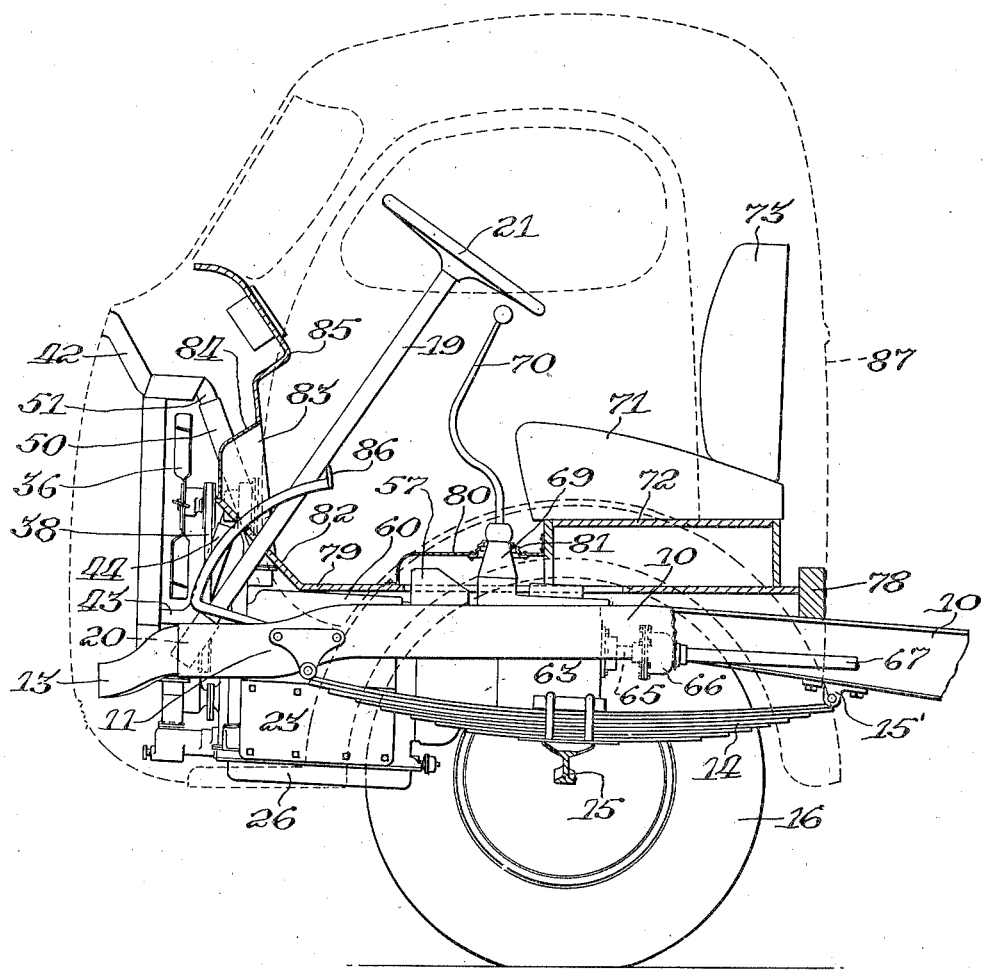
Figure 3 is a vertical, longitudinal section with the cab shown in dotted lines in order to show the positions of the units relative to the cab.
Figure 4:
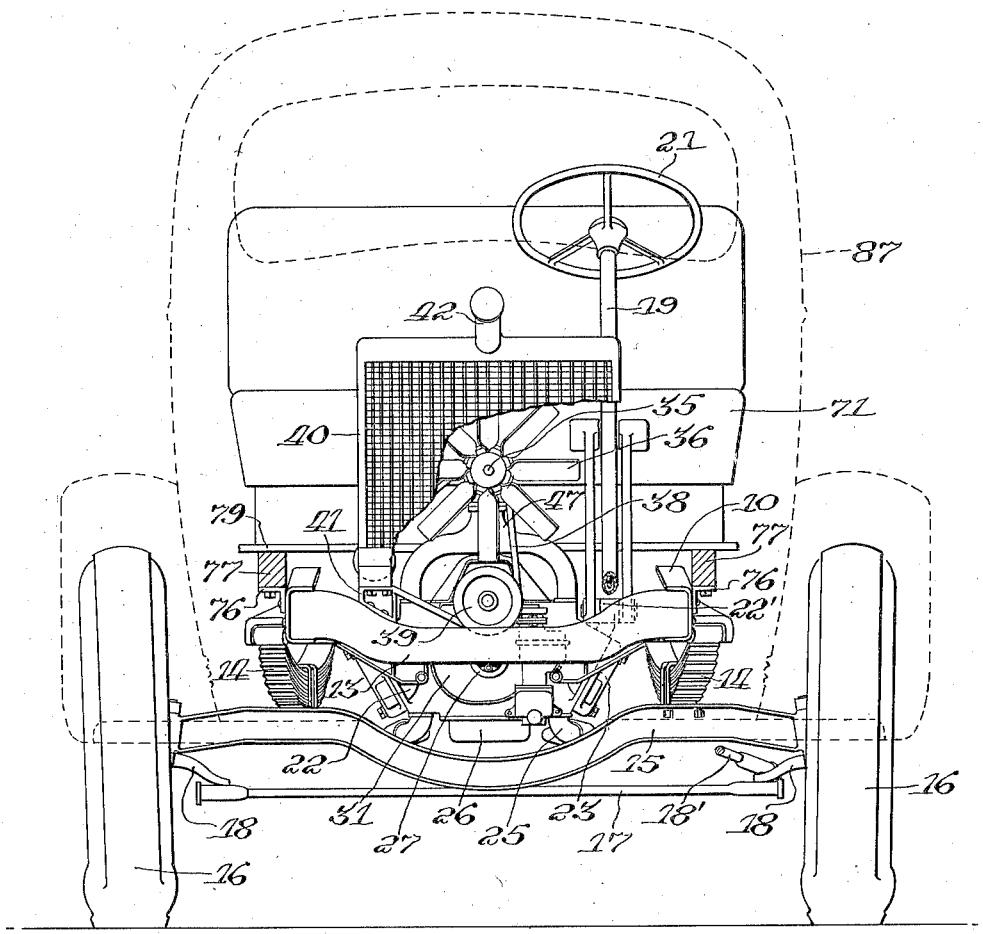
Figure 4 is a front end view with the cab shown in dotted lines and with a portion of the radiator broken away to better show the various units of the power plant and their relative positions.

Cylinder heads 23 have been shown in which spark plugs 24 are mounted. It will be understood that the motor is of the L-head type. The cylinder heads, located as best shown in Figures 3 and 4, are accessible for removal from beneath the vehicle, the angle of the heads being such as to be conveniently accessible to a mechanic seated below the truck.

Figure 6:
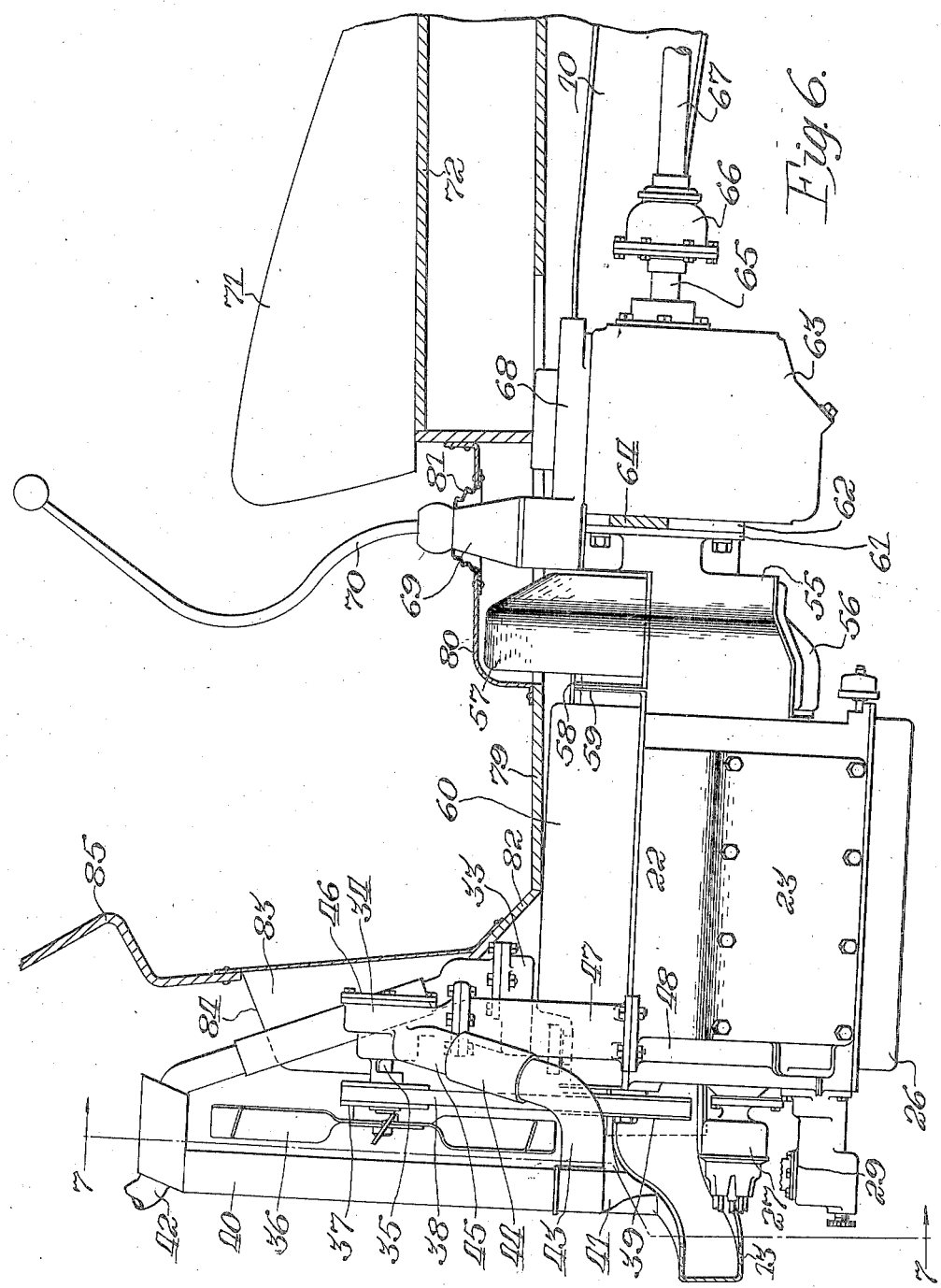
Figure 6 is in general a longitudinal, vertical section with the power plant being shown substantially in elevation.
Figure 7:
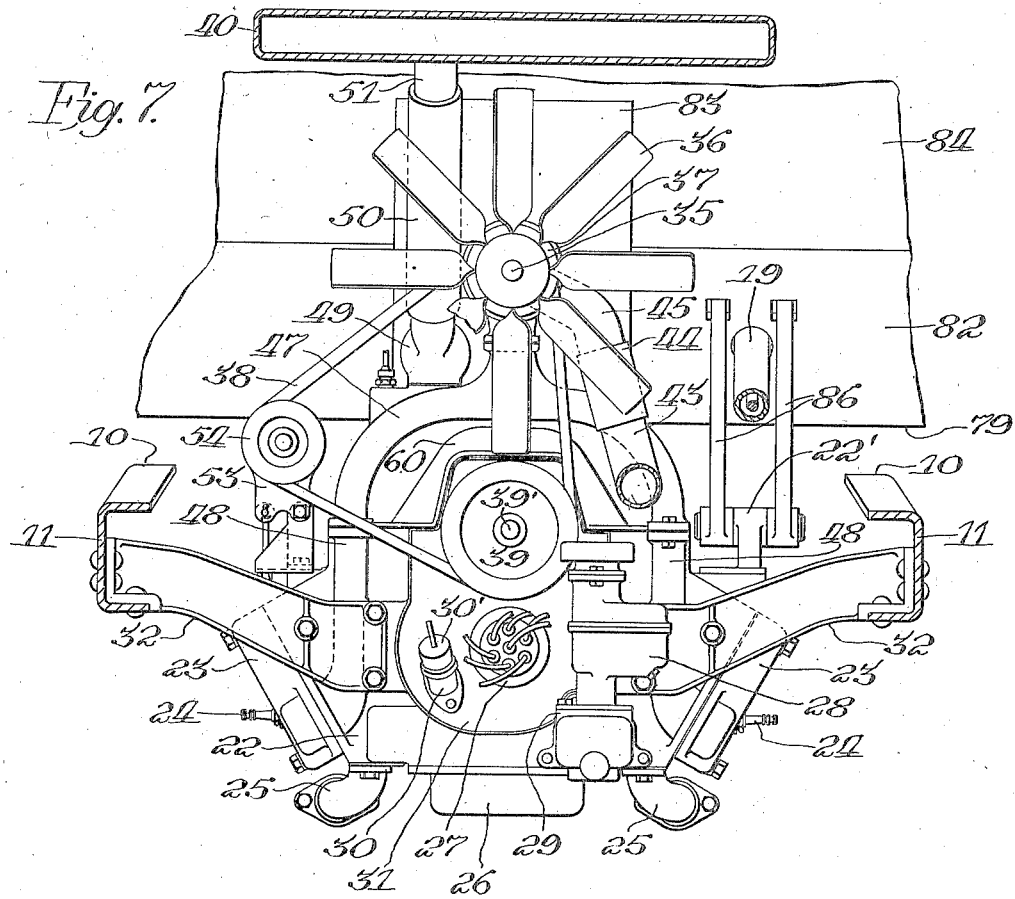
Figure 7 is a transverse, vertical section taken on the line 7—7 of Figure 6; and, Figure 8 is a transverse, vertical section taken on the line 8—8 of Figure 5.
Figure 8:
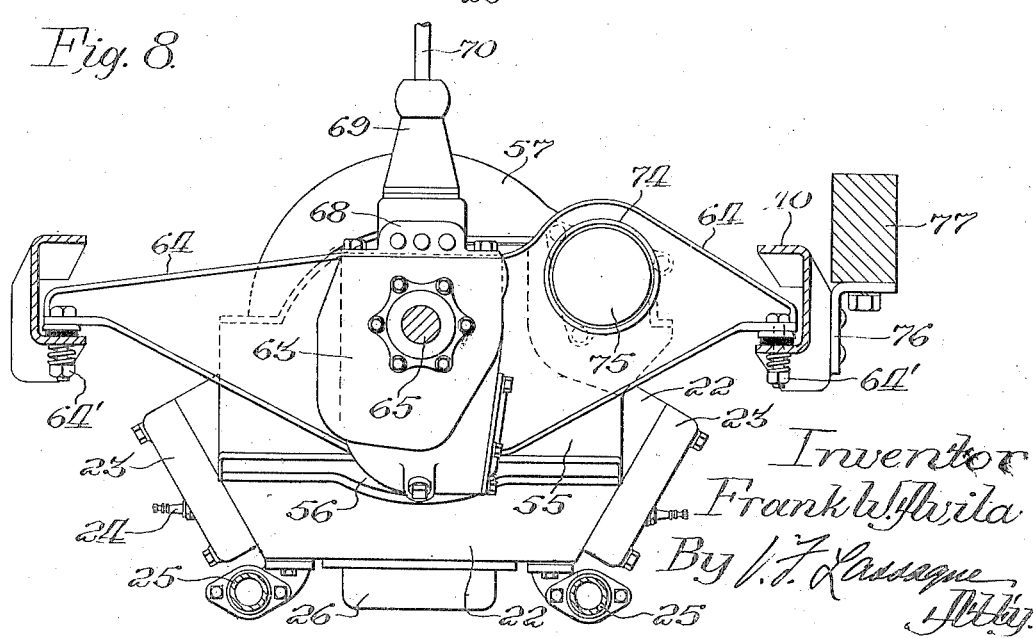

As best shown in Figures 7 and 8, exhaust pipes 25 extend longitudinally of the engine at the bottom side thereof. Said exhaust pipes are to be connected either to a single exhaust pipe or to a common exhaust line at the rear of the motor. A cover 26 is also shown in these two figures, as well as in Figures 3 and 6. Said cover, which forms an oil reservoir, is removable to gain access to the valve mechanism.

A distributor 27 is shown mounted on the front of the motor, preferably being in direct alinement with the cam shaft and driven thereby. Wires lead from the distributor to the spark plugs on the two cylinder heads. These wires have been broken away, as their presence would tend to confuse the drawing.

A carburetor 28, having an inlet on which an air cleaner or an intake silencer may be mounted, is positioned at the front of the engine. A flange at the base of the carburetor is mounted on a flange 29 surrounding an intake to the inlet manifold, which is housed between the two banks of cylinders.

A filler spout 30, mounted on a front cover 31 of the engine block, is provided with a stopper 30' carrying an oil gauge rod to determine the depth of oil in the pan 26. It will be understood in the description to follow that the units mounted at the front of the engine are accessible from the front of the cab when the radiator grill is removed, as will be described in greater detail.

Means have been shown for mounting the front of the engine on the forward portions 11 of the side frame members 10 consisting of ribbed brackets 32 secured to the engine block at the sides thereof and to the frame members. It will be understood that any type of engine mounting, such as the resilient mountings now widely used, could be employed. A casting 33, mounted at the top of the engine block, contains passages for delivering a cooling fluid to the pump, which is housed in a casting 34 mounted on the casting 33. Said pump is provided with a forwardly extending shaft 35, on which a cooling fan 36 and a drive pulley 37 are mounted. The fan and the pump are driven by a belt 38 driven from a drive pulley 39 mounted on an extension 39' of the crank shaft of the engine extending from the forward end of the engine block.

A cooling radiator 40 is shown as being mounted on brackets 41 secured to the front cross frame member 13. Said radiator is provided with a filling spout 42. At the bottom of the radiator, an outlet conduit 43 is connected by a hose 44 with an inlet fitting 45 on the pump casing 34. It will be noted that a plate 46 is removably mounted at the rear of the pump casing to provide for access to inspect or repair the pump. From the pump casing 34 water is discharged downwardly through a manifold 47 formed in the casting 33. Said manifold, as best shown in Figure 7, connects with inlets 48 communicating with the cooling jackets of the blocks. The outlets from the engine blocks communicate with an outlet fitting 49, which is connected by a hose 50 with a fitting 51 leading into the top header of the radiator 40.

A generator 52 is shown mounted on a bracket 53 adjustably pivoted at one side of the engine. The generator is driven by a pulley 54 by means of the same belt 38 which drives the water pump and fan.

As best shown in Figure 6, the engine block has an integral extension 55 at the rear, which forms a portion of the fly-wheel housing. To complete the lower portion of the fly-wheel housing, a sheet metal cover 56 is secured to the open bottom portion of the extension 55. To complete the upper portion of the fly-wheel housing, a flanged cover 57 is secured to the open upper portion of the extension 55. It will be noted that the front side of the cover 57 is formed with an arcuate flange 58 mating with a corresponding flange 59 formed on a crank case cover 60. Said crank case cover is flanged around its entire periphery and is secured to the flanged upper portion of the engine block. Said cover may be removed for access to the crank case for adjusting or removing the connecting rod and crank shaft bearings.

Figure 5:
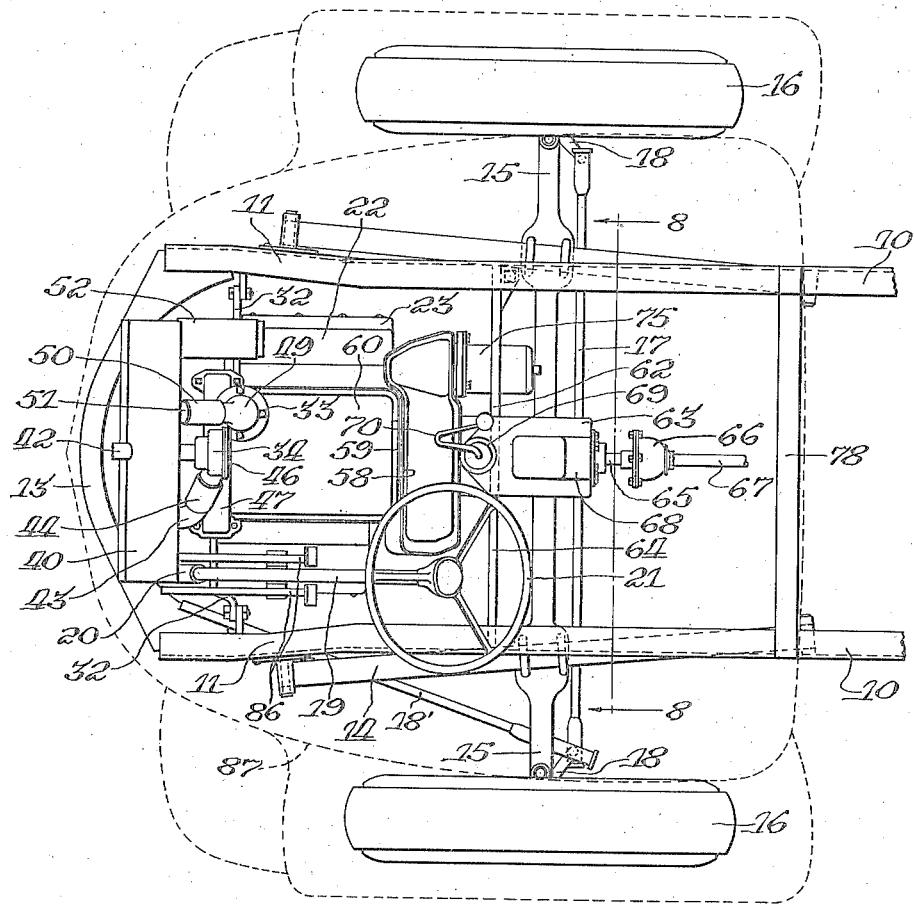
Figure 5 is a plan view of the same structure shown in Figures 3 and 4, the outline of the cab and fenders being shown in dotted lines.

The front end of the extension 55 is formed with a flange 61 having a vertical face for attaching the rear engine support 62 and transmission case 63. As best shown in Figures 5 and 8, the rear engine support 62 consists of a laterally extending plate having arms 64 resiliently connected by elements 64' to the side frame members 10. It is to be understood that any suitable supporting means might be utilized at the rear, the one shown being only representative of a two-point rear suspension for the motor and transmission, which are assembled into a single unit.

A drive shaft 65 extending rearwardly from the transmission case 63 is connected by a universal joint 66 with a propeller shaft 67. Said propeller shaft extends rearwardly and may be connected to any suitable final drive mechanism.

In order to move the gear shift mechanism forwardly, a housing 68 is mounted at the top of the transmission. Said housing extends forwardly to an upwardly projecting gear shift lever mounting member 69. Conventional shifting mechanism may be contained in the housing 68, the construction being provided to move the actuating mechanism forwardly. A gear shift lever 70, extending from the member 69, is curved to clear an operator's seat 71 and to extend rearwardly at the upper end into a position accessible to the operator. The seat 71 is mounted on a seat box 72, which is carried by the cab structure. A seat back 73 is also shown in Figure 3 in its proper relative position in the cab.

The rear engine support 64 is formed with an opening 74 for attachment of a starter motor 75 to an upward extension of the cast portion 55 of the fly-wheel housing, as shown in dotted lines in Figure 8. It will be noted that both the starter motor and the generator are located at a sufficiently low level to permit the floor of the driver's compartment to lie closely adjacent to the top of the engine.

For attaching the cab to the chassis, forward front brackets 76 have been illustrated, as best shown in Figure 4. Longitudinally extending sills 77 are illustrated as being mounted on the brackets 76 at their front ends. At the rear of the cab, a cross sill 78 is shown mounted directly on the side frame members 10. In Figure 4, a floor 79 is shown as extending transversely, being mounted directly on the sills 77. The level of the floor is also shown in Figure 3 and in Figure 7. It will be understood that the floor is flat across the bottom of the cab except for that portion which is cut away where the fly-wheel cover 57 projects upwardly. The cut-away portion is enclosed by a cover 80. Said cover is flanged around its bottom for connection with the floor and is flanged at the rear in a vertical plane for connection with the front wall of the seat box 72. An opening is provided in the top of the cover 80 through which the gear shift lever support 69 extends, a suitable flexible sealing member 81 being provided to close the opening.

Forwardly of the flat portion of the floor 79, an angled portion 82 extends upwardly, as is conventional in automotive vehicles. The upward extension permits clearance of the floor above certain of the units and accessories mounted at the front. It is, however, necessary to provide a tunnel portion 83 surrounding the water pump. Otherwise, as shown in Figure 3, the floor extends on a transverse line as far forward as the pulley on the water pump. A sheet metal dash member 84 extends upwardly and rearwardly to a dash panel 85. Said panel is shown as being shaped with a face portion on which the conventional instruments are mounted. By this construction of the floor boards, the cowl and the dash, sufficient room is obtained for the feet of the operator and passengers in the cab, without interference with proper positioning of the power plant accessories. The tunnel portion 83 is at the center where it in no way interferes with the necessary foot room. The clutch and brake pedals 86 extend through openings in the angular portion 82 of the floor, being pivotally supported on a bracket 22' rigidly carried by the engine block. The connections from these pedals to the brake and clutch have not been shown, as they are conventional and as the showing of all of the details would tend to confuse the invention, which resides in the general arrangement of the inverted V-engine and its accessories relative to the frame and the cab.

A cab 87, which heretofore has been referred to only generally, is mounted on the sills 77 and on other associated and cooperating elements, not shown. The general outline of the cab has been shown in Figures 1 and 2 to illustrate the compactness of a vehicle incorporating applicant's invention. The vertical height is very low, even though the operator is provided with sufficient head room and seat height. The over-all dimension of the cab in a longitudinal direction is very small due to the fact that the power plant requires no space except for the radiator and the cooling fan back of the radiator. There is sufficient space for the power plant beneath the side frame members and below the frame with required allowance for road clearance, because of the particular design of the wide angle, the inverted V-engine, and of the particular location thereon of the accessories. Access to the cylinder heads is obtained, as they are exposed in a position beneath the truck at an angle to be conveniently reached by a mechanic. The connecting rods and the main bearings can be reached by removal of the floor boards and of the crank case cover 60, giving access under very favorable conditions from the interior of the cab.

Figure 2:
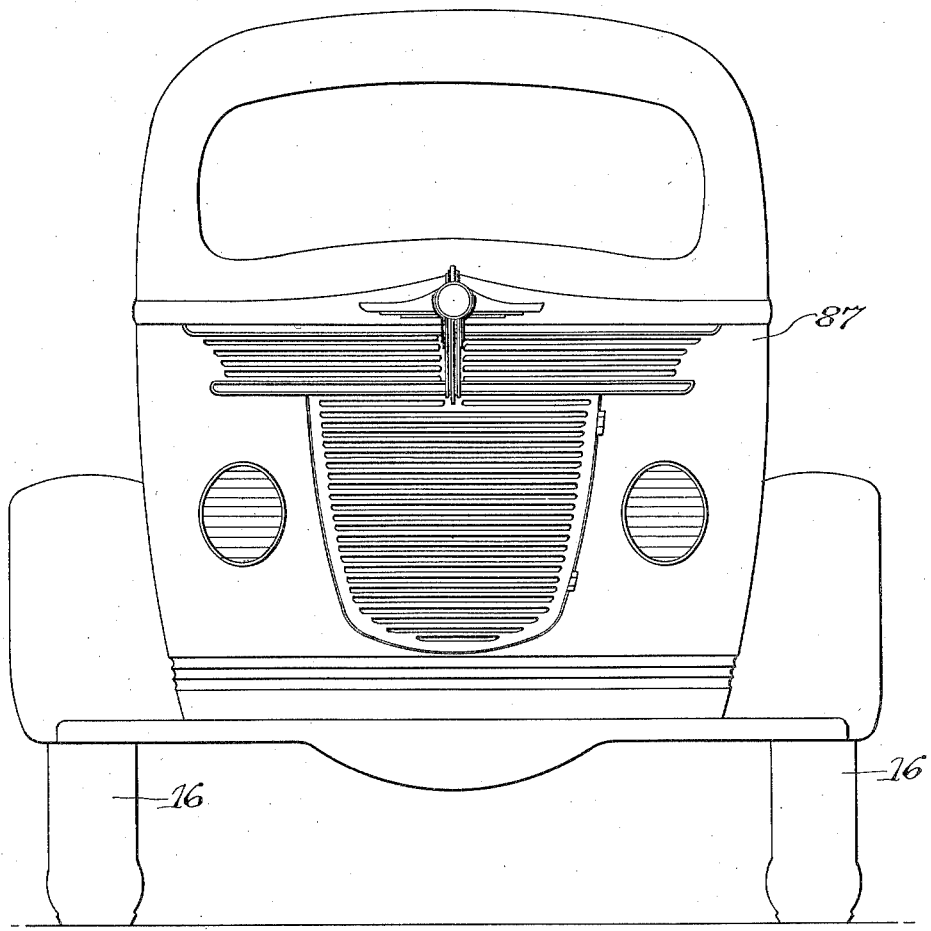
Figure 2 is a front end elevation of the vehicle shown in Figure 1.

As previously pointed out, the engine accessories needing the most frequent attention are located at the front of the engine where they may be reached from the front of the cab. As illustrated in Figures 1 and 2, the front grill is hinged at one side and provided with latch means at the other side, whereby it may be swung back for access to the carburetor, the distributor, and the oil filler and gauge. By removing the radiator from the front, access may be gained to the entire front end of the engine. By removing the tunnel in the cab, access may be had to the water pump by removing the plate 46.

It should be noted that applicant, in the drawings and in the description, has attempted to eliminate as many elements unnecessary to a proper showing of the invention as possible, in order to more definitely point out and describe the elements which are essential to an embodiment of the invention. It is also to be understood that applicant has only shown a preferred embodiment of his vehicle and power plant construction, and that he claims as his invention all modifications falling within the scope of the appended claims.

What is claimed is:

1. In an automotive vehicle, a frame, an inverted multiple cylinder engine supported on said frame, the crank case being at the top and the cylinders extending downwardly beneath the frame and outwardly whereby they are accessible from beneath the vehicle, and a floor for an operator's compartment lying closely adjacent the crank case.

2. In an automotive vehicle, a frame, an inverted multiple cylinder engine on said frame with substantially all of said engine lying below the upper level of the frame, the crank case being at the top and the cylinders extending downwardly beneath the frame and outwardly whereby they are accessible from beneath the vehicle, and a floor for an operator's compartment lying closely adjacent the upper level of the frame and the top of the crank case.

3. In an automotive vehicle, a frame, an inverted multiple cylinder engine on said frame with substantially all of said engine lying below the upper level of the frame, the crank case being at the top and the cylinders extending downwardly beneath the frame and outwardly whereby they are accessible from beneath the vehicle, and a floor for an operator's compartment lying closely adjacent the upper level of the frame and the top of the crank case, said engine having a fly-wheel housing projecting upwardly above the floor level.

4. In an automotive vehicle, a frame, an inverted V-engine supported on said frame, the crank case being at the top and two banks of cylinders extending downwardly beneath the frame and outwardly whereby they are accessible from beneath the vehicle, a floor for an operator's compartment lying closely adjacent the crank case, said floor being removable for access to said crank case, said engine having a flywheel housing projecting upwardly above the floor level, and a shield mounted on the floor spaced from said housing.

5. In an automotive vehicle, a frame, an inverted V-engine mounted on said frame, the two banks of cylinders extending downwardly beneath the frame and outwardly, a cab mounted on the front end of the frame, the floor of said cab lying closely adjacent the top portion of the engine, and a starter motor mounted at one side of the engine below the floor level thereof.

6. In an automotive vehicle, a frame, an inverted multiple cylinder engine supported at the front end of the frame, the crank case being at the top and the cylinders extending downwardly beneath the frame and outwardly whereby they are accessible from beneath the vehicle, a body mounted on the frame over said engine, a floor in said body lying closely adjacent the crank case, said floor being removable for access to the crank case, said engine having a fly-wheel housing projecting upwardly above the floor level at the rear of the crank case, and a shield mounted on the floor over said housing.

7. In an automotive vehicle, a frame, an inverted V-engine supported at the front end of the frame, the crank case being at the top and two banks of cylinders extending downwardly beneath the frame and outwardly whereby they are accessible from beneath the vehicle, a cab mounted on the frame over said engine, a floor in said cab lying closely adjacent the crank case, said floor being removable for access to the crank case, said engine having a fly-wheel housing projecting upwardly above the floor level at the rear of the crank case, and a shield mounted on the floor spaced from said housing.

8. In an automotive vehicle, a frame, an inverted V-engine supported at the front end of the frame, the crank case being at the top and two banks of cylinders extending downwardly beneath the frame and outwardly whereby they are accessible from beneath the vehicle, a cab mounted on the frame over said engine, a seat at the rear of said cab, a floor in said cab overlying the crank case, said floor being removable for access to the crank case, said engine having a fly-wheel housing projecting upwardly above the floor level at the rear of the crank case and forwardly of the seat, and a shield mounted on the floor spaced from said housing.

9. In an automotive vehicle, a frame, an inverted V-engine supported at the front end of the frame, the crank case being at the top and two banks of cylinders extending downwardly beneath the frame and outwardly whereby they are accessible from beneath the vehicle, a cab mounted on the frame over said engine, a seat-box at the rear of said cab having a substantially vertical front wall, an operator's seat on said box, a floor in said cab overlying the crank case, said floor being removable for access to the crank case, said engine having a fly-wheel housing projecting upwardly above the floor level at the rear of the crank case and forwardly of the seat-box, and a shield mounted on the floor above said housing and connected to the front wall of the seat-box.

10. In an automotive vehicle, a frame, an inverted multiple cylinder engine supported on said frame, the crank case being at the top and the cylinders extending downwardly beneath the frame and outwardly whereby they are accessible from beneath the vehicle, a floor for an operator's compartment lying closely adjacent the crank case, a transmission at the rear of the engine and controlling means for said transmission extending forwardly and upwardly through the floor into the operator's compartment.

11. In an automotive vehicle, a frame, an inverted multiple engine supported on the front of said frame, the crank case of said engine being at the top and the cylinders extending downwardly beneath the frame and outwardly whereby they are accessible from beneath the vehicle, a body mounted on the frame over said engine, a driver's seat in said body rearwardly from the engine, a floor in said body overlying the crank case, a transmission at the rear of the engine, the major portion of which is under the seat, and a forward control for said transmission extending upwardly between the crank case and the seat.

12. In an automotive vehicle, a frame, an inverted V-engine supported on the front of said frame, the crank case of said engine being at the top and the two banks of cylinders extending downwardly beneath the frame and outwardly whereby they are accessible from beneath the vehicle, a cab mounted on the frame over said engine, a driver's seat at the rear of said cab, a floor in said cab overlying the crank case, said engine having a fly-wheel housing at the rear of the crank case projecting upwardly above the floor level forwardly of the seat, a transmission at the rear of said housing, the major portion of which is under the seat, a control for said transmission extending upwardly between the fly-wheel housing and the seat, and a shield mounted on the floor spaced from the housing and provided with an opening for the transmission control.

13. In an automotive vehicle, a frame, an inverted multiple cylinder engine supported on said frame, the crank case being at the top and the cylinders extending downwardly beneath the frame and outwardly whereby they are accessible from beneath the vehicle, a substantially flat floor for an operator's compartment lying closely adjacent the crank case, said floor being removable for access to said crank case, a radiator mounted forwardly of the floor, and a cowl extending upwardly from the floor and forming an enclosed compartment at the rear of the radiator.

14. In an automotive vehicle, a frame, an inverted multiple cylinder engine supported on said frame, the crank case being at the top and the cylinders extending downwardly beneath the frame and outwardly whereby they are accessible from beneath the vehicle, a substantially flat floor for an operator's compartment lying closely adjacent the crank case, a radiator mounted forwardly of the floor, a cowl extending upwardly from the floor and forming an enclosed compartment at the rear of the radiator, a water pump mounted in said compartment, and a cowl section removable for access to said pump.

15. In an automotive vehicle, a frame including side members spaced apart at the front end of the vehicle, an inverted V-engine mounted between said frame members, the two banks of cylinders extending downwardly beneath the frame and outwardly whereby they are accessible from beneath the vehicle, a cab mounted on the front end of the frame, the floor of said cab lying closely adjacent the top portion of the engine, said floor being removable for access to the crank case of the engine, a radiator mounted at the forward end of the cab, a cooling fan mounted at the rear of the radiator, and a cowl extending upwardly from the floor of the cab and forming a compartment to house the radiator and the cooling fan therefor.

16. In an automotive vehicle, a frame, an inverted multiple cylinder engine mounted on said frame, the cylinders extending downwardly below the frame and outwardly, the crank case being along the top, a floor for an operator's compartment lying closely adjacent the crank case of the engine, a radiator mounted at the front of the frame, an oil filler spout located at the front of the engine, and a removable closure at the front of the cab for access to said oil filler spout.

17. In an automotive vehicle, a frame, an inverted multiple cylinder engine mounted on said frame, the cylinders extending downwardly below the frame and outwardly, the crank case being along the top, a floor for an operator's compartment lying closely adjacent the crank case of the engine, a radiator mounted at the front of the frame, a distributor mounted at the front of the engine below the radiator, and a removable closure at the front of the cab for access to said distributor.

18. In an automotive vehicle, a frame, an inverted multiple cylinder engine mounted on said frame, the cylinders extending downwardly below the frame and outwardly, the crank case being along the top, a floor for an operator's compartment lying closely adjacent the crank case of the engine, a radiator mounted at the front of the frame, a carbuertor mounted at the front of the engine below the radiator, and a removable closure at the front of the cab for access to said carburetor.

19. In an automotive vehicle, a frame, an inverted multiple cylinder engine mounted on said frame, the cylinders extending downwardly below the frame and outwardly, the crank case being along the top, a floor for an operator's compartment lying closely adjacent the crank case of the engine, a radiator mounted at the front of the frame, a carburetor mounted at the front of the engine below the radiator, a distributor mounted at the front of the engine below the radiator, an oil filler spout located at the front of the engine, and a removable closure at the front of the cab for access to said accessories.

20. In an automotive vehicle, a frame, a downwardly dipped front cross frame member, an inverted multiple cylinder V-engine mounted on said frame at the rear of the front frame member, the two banks of cylinders extending downwardly below the frame, the crank case being along the top, a cab mounted on the front end of the frame, the floor of said cab lying closely adjacent the crank case of the engine, a radiator mounted at the front of the cab and extending upwardly above the frame, a carburetor mounted at the front of the engine below the radiator and rearwardly of the front cross member, a distributor mounted at the front of the engine below the radiator, an oil filler spout located at the front of the engine, and a removable closure at the cab for access to said accessories.

21. In an automotive vehicle, a frame having a cross frame member at the front, an inverted multiple cylinder V-engine mounted on said frame, the two banks of cylinders extending downwardly below the frame, the crank case being along the top, a cab mounted on the front end of the frame, the floor of said cab lying closely adjacent the crank case of the engine, a radiator mounted at the front of the cab and extending upwardly above the frame, the bottom of said radiator being spaced from the cross frame member, a carburetor mounted at the front of the engine below the radiator, a distributor mounted at the front of the engine below the radiator, and a removable grill and closure at the front of the cab for access to said radiator and accessories.

22. In an automotive vehicle, a frame, an inverted multiple cylinder engine mounted on said frame, the cylinders extending downwardly and outwardly and the crank case being along the top, a body mounted on said frame, a floor near the front of said body lying closely adjacent the crank case of the engine, a radiator mounted at the front of the body above the frame, a cooling water conduit member extending upwardly from the engine back of said fan, a water pump housing carried by said member, a combined pump and fan shaft extending forwardly from said housing, and a fan mounted on said shaft at the rear of the radiator.

23. In an automotive vehicle, a frame, an inverted multiple cylinder engine mounted on said frame, the cylinders extending downwardly and outwardly and the crank case being along the top, a body mounted on said frame, a floor near the front of said body lying closely adjacent the crank case of the engine, a radiator mounted at the front of the body above the frame, a cooling water conduit member extending upwardly from the engine back of said fan, a water pump housing carried by said member, a plate at the rear of said housing removable for access to the pump, a combined pump and fan shaft extending forwardly from said housing, and a fan mounted on said shaft at the rear of the radiator.

24. In an automotive vehicle, a frame, an inverted multiple cylinder engine mounted on said frame, the cylinders extending downwardly and outwardly and the crank case being along the top, a body mounted on said frame, a floor near the front of said body lying closely adjacent the crank case of the engine, a radiator mounted at the front of the body above the frame, a cooling water conduit member extending upwardly from the engine back of said fan, a water pump housing carried by said member, a combined pump and fan shaft extending forwardly from said housing, a fan mounted on said shaft at the rear of the radiator, a cowl extending upwardly from the floor rearwardly of the radiator, and a removable cowl section for access to the pump.

25. In an automotive vehicle, a frame including side members spaced apart at the front end of the vehicle, an inverted multiple cylinder V-engine mounted between said frame members, the two banks of cylinders extending downwardly and outwardly and the crank case being along the top, a body mounted on said frame, a floor in said body lying closely adjacent the crank case of the engine, a radiator mounted at the front of the body above the frame, a cooling water conduit member mounted on the front of the engine back of said fan, a water pump housing carried by said member, cowl sections extending upwardly and forwardly of the pump at the sides thereof, and a shield mounted around the pump and joining the cowl sections.

26. In an automotive vehicle, a frame including side members spaced apart at the front end of the vehicle, an inverted multiple cylinder V-engine mounted between said frame members, the two banks of cylinders extending downwardly and outwardly and the crank case being along the top, a body mounted on said frame, a floor in said body lying closely adjacent the crank case of the engine, a radiator mounted at the front of the body above the frame, a cooling water conduit member mounted on the front of the engine back of said fan, a water pump housing carried by said member, a plate at the rear of said housing removable for access to the pump, cowl sections extending upwardly and forwardly of the pump at the sides thereof, and a shield mounted around the pump and joining the cowl sections, said shield being removable for access to the plate on the pump housing.

FRANK W. AVILA.